United States Patent [19]

Bory et al.

[11] 3,975,667

[45] Aug. 17, 1976

[54] APPARATUS FOR A MACHINE TOOL FOR THE AUTOMATIC GENERATING OF A SWITCHING SIGNAL AND FOR REDUCING THE SPEED OF A TOOL

[75] Inventors: Michael Bory, Zurich; Georg Grendelmeier, Dietikon, both of Switzerland

[73] Assignee: Werkzeugmaschinenfabrik Oerlikon-Buhrle AG, Zurich, Switzerland

[22] Filed: Nov. 11, 1974

[21] Appl. No.: 522,745

[30] Foreign Application Priority Data

Nov. 19, 1973  Switzerland............... 16240/73

[52] U.S. Cl. .................................. 318/39; 318/571
[51] Int. Cl.² ................................... H02P 7/00
[58] Field of Search ............. 318/39, 571, 591, 592

[56] References Cited

UNITED STATES PATENTS

| 3,273,182 | 9/1966 | McDonald | 318/571 X |
| 3,573,588 | 4/1971 | Geyer et al. | 318/571 |
| 3,595,132 | 7/1971 | Thacker | 318/39 X |
| 3,896,360 | 7/1975 | Meyer et al. | 318/571 |

*Primary Examiner*—Robert K. Schaefer
*Assistant Examiner*—W. E. Duncanson, Jr.
*Attorney, Agent, or Firm*—Werner W. Kleeman

[57] ABSTRACT

An apparatus for a machine tool for the automatic generation of a switching signal and for reducing the speed of a tool from the advance feed stroke into the work stroke upon approach of the tool at the workpiece. The invention contemplates mechanism for accelerating the tool opposite to the feed direction or stroke and which upon approaching of the tool at the workpiece is electrically actuated by the switching signal.

11 Claims, 5 Drawing Figures

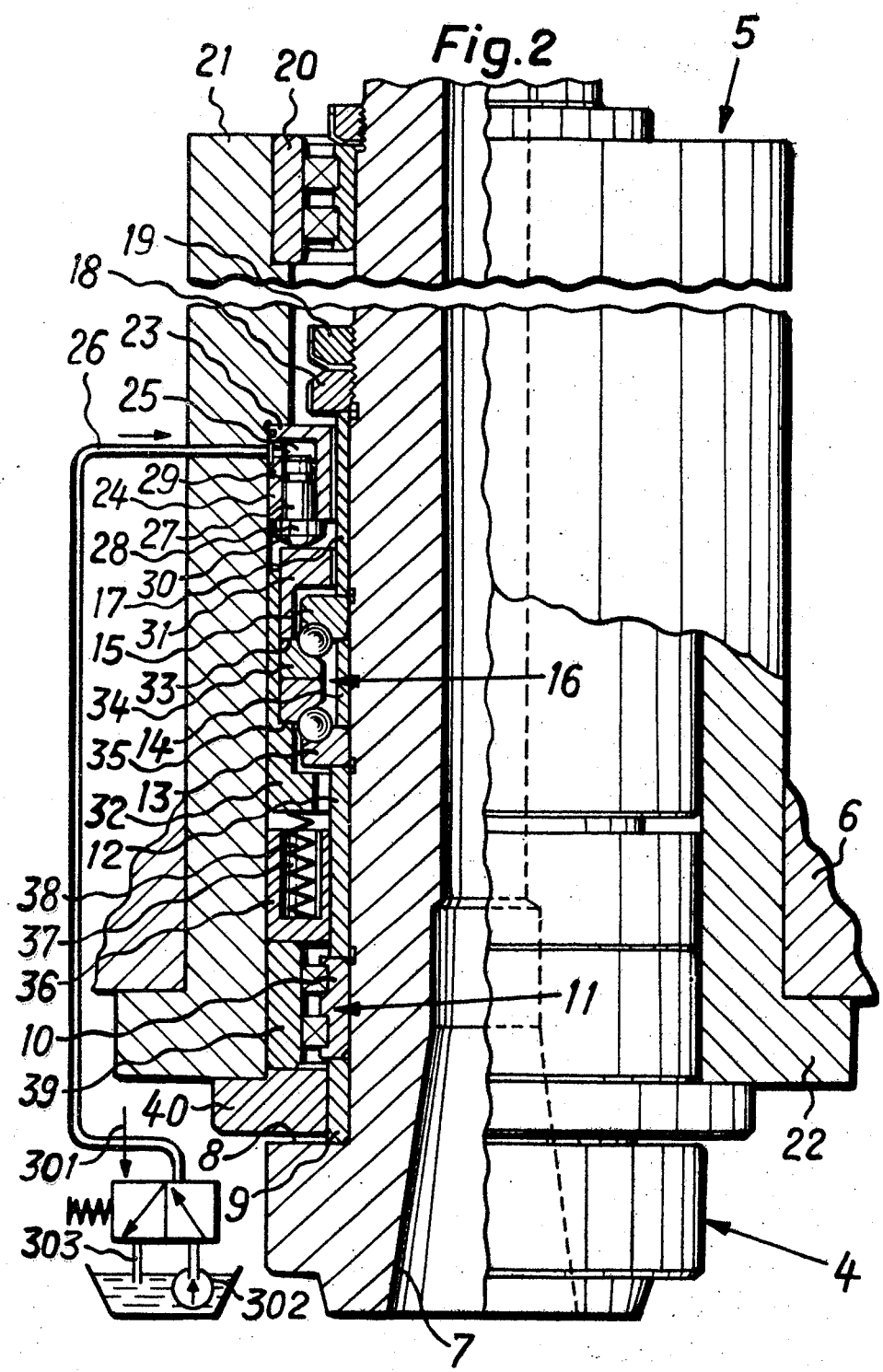

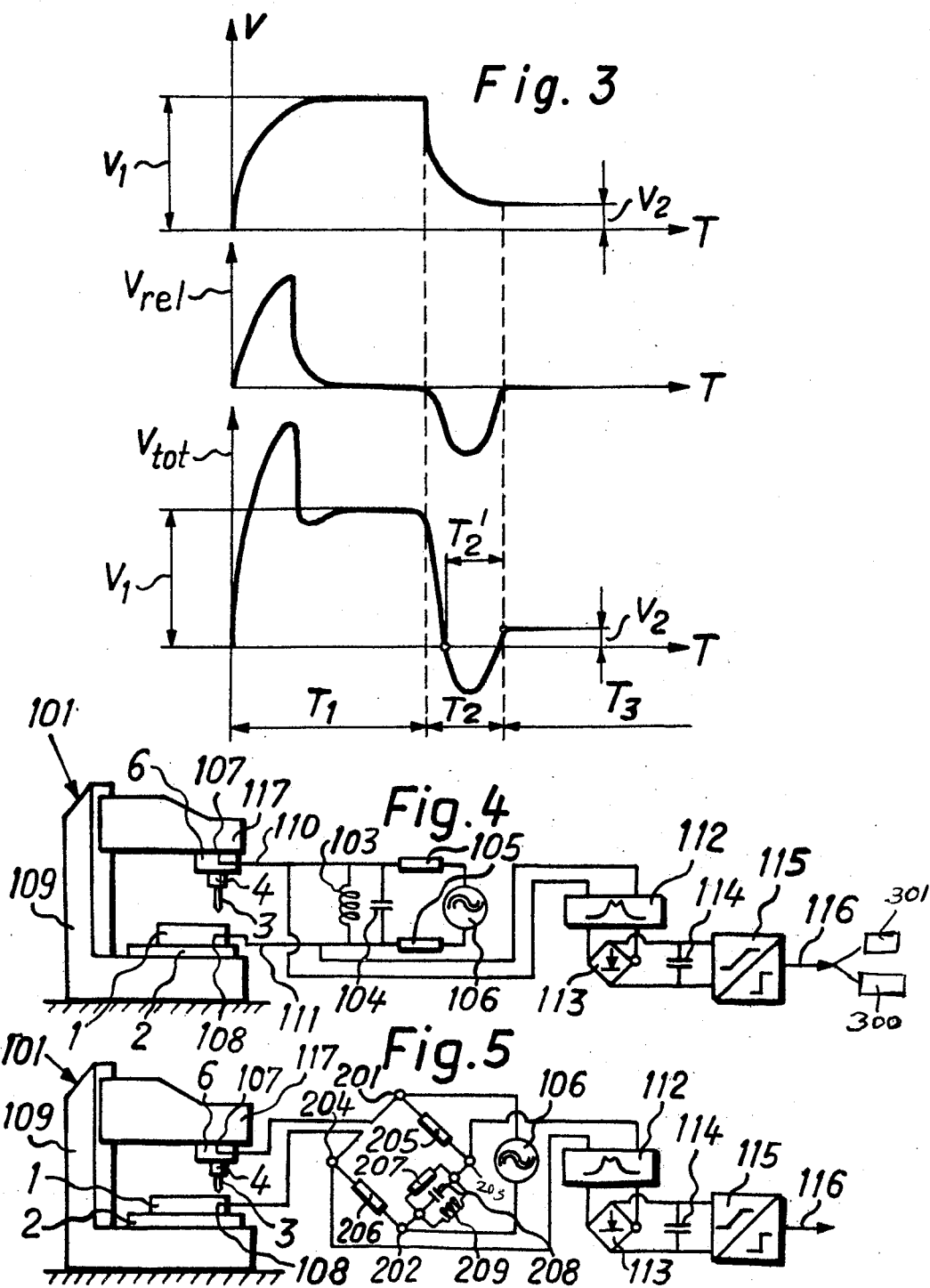

APPARATUS FOR A MACHINE TOOL FOR THE AUTOMATIC GENERATING OF A SWITCHING SIGNAL AND FOR REDUCING THE SPEED OF A TOOL

BACKGROUND OF THE INVENTION

The present invention relates to a new and improved construction of apparatus at a machine tool for the automatic generation of a switching signal and for reducing the speed of a tool from the feed stroke to the work stroke during approach of the tool at a workpiece.

According to a known apparatus of this type, for instance as exemplified by the German Pat. publication 1,801,418, there is produced an electrical signal proportional to the speed of the tool, for instance a direct-current signal, which drops below a predetermined value upon the deceleration of the tool brought about by contact with the workpiece. This direct-current signal is delivered to a regulator monitoring circuit which then, upon dropping below the aforementioned value, triggers the switching signal which reverses the movement of the tool from the rapid feed motion of the work stroke.

This prior art equipment firstly possesses the drawback that for generating the switch signal a deceleration of the tool is necessary due to the contact with the workpiece, i.e. measurable forces exerted upon the tool during the contact of the workpiece are required in order to trigger a switching signal.

Secondly, the prior art equipment is associated with the drawback that the kinetic energy of the moved tool must be taken up in a very short period of time exclusively by switching the feed drive. When the deceleration of the movement does not occur rapidly enough and cannot be initiated early enough, then, there exists the danger that the tool, for instance a drill, will rupture upon contact with the workpiece.

SUMMARY OF THE INVENTION

Hence, it is a primary object of the present invention to avoid both these drawbacks and to provide apparatus in which the switching signal is triggered soon enough, not first when there occur dangerous deceleration forces and wherein the relative movement between the tool and the workpiece can be reduced more rapidly than during a simple switching of the feed drive.

Now in order to implement these objects and others which will become more readily apparent as the description proceeds, the inventive apparatus is manifested by the features that there is provided a mechanism for accelerating the tool opposite to the feed stroke and which upon approach of the tool at the workpiece is electrically actuatable by the switching signal.

BRIEF DESCRIPTION OF THE DRAWINGS

The invention will be better understood and objects other than those set forth above, will become apparent when consideration is given to the following detailed description thereof. Such description makes reference to the annexed drawings wherein essentially the same reference characters have been used throughout for the same components, and wherein:

FIG. 2 is an axial sectional view through the drilling spindle and its mounting sleeve or tail spindle, as well as the mechanism or apparatus actuatable by the switching signal for accelerating the tool;

FIG. 3 represent velocity-time graphs for the spindle sleeve movement and the spindle movement;

FIG. 4 is a simplified perspective illustration of a drilling machine and an electrical circuit diagram for an exemplary embodiment of the electrical part of the inventive apparatus containing the elements required for generating the switching signal; and FIG. 5 is the same illustration as FIG. 4 of a further simplified switching circuit of another exemplary embodiment of the electrical part of the inventive apparatus.

DETAILED DESCRIPTION OF THE PREFERRED EMBODIMENTS

Figure 1:
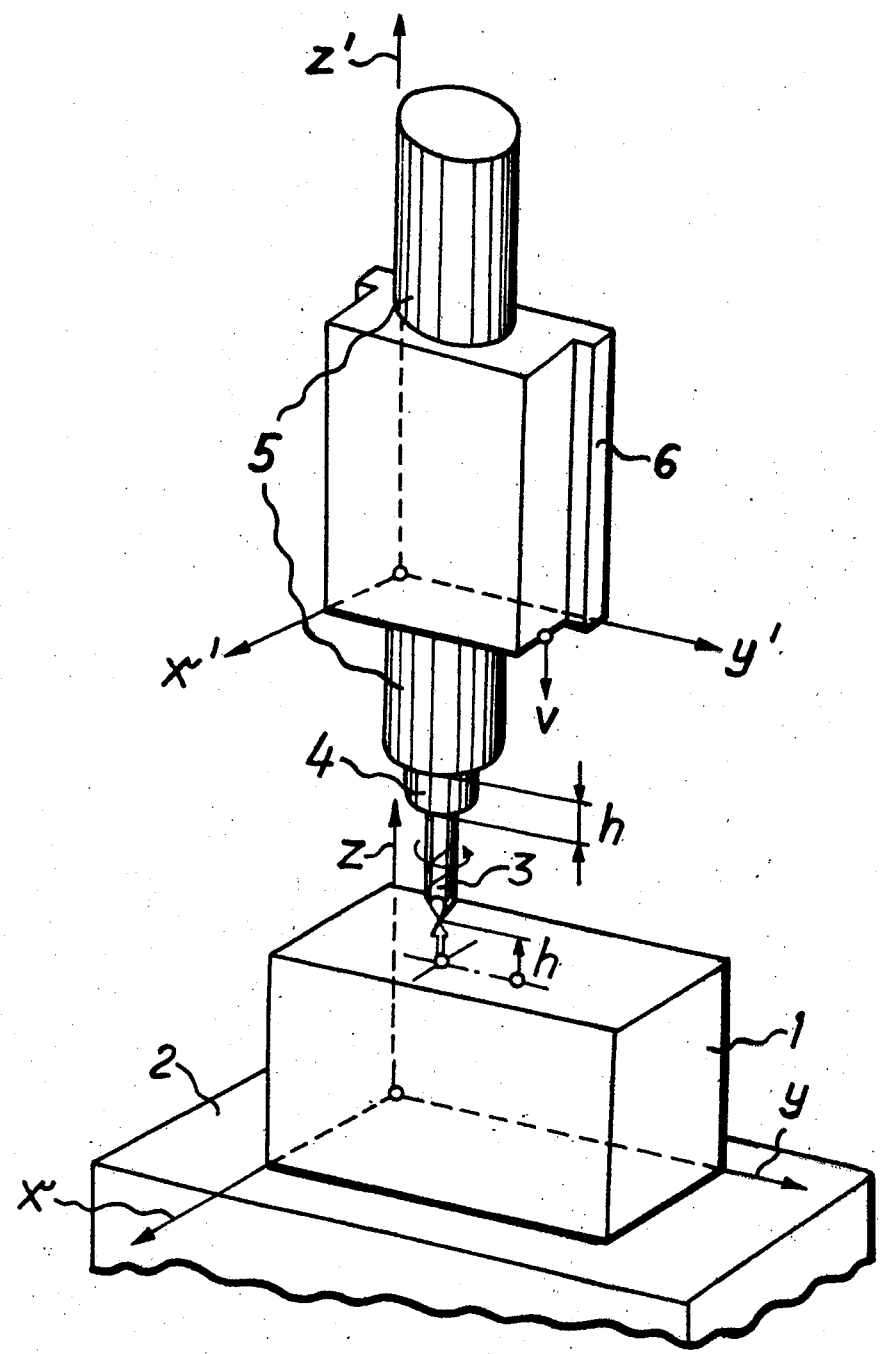
FIG. 1 is a simplified perspective illustration of parts of a drilling or boring machine with the workpiece and tool.

Describing now the drawings, according to the showing of FIGS. 1 and 4 a workpiece 1 is secured to a stationary horizontal workpiece clamping or chuck table 2. A drill 3 is secured in a vertical bore or drill spindle 4. The drill spindle 4 is rotatable and also can be axially displaced through the distance $h$ in a spindle sleeve or tail spindle 5, which spindle sleeve 5 in turn is arranged in a headstock 6 and displaceable in axial direction. The headstock 6 is displaceably mounted in a carrier or support 117 which is secured to a stand 109 of the drilling machine or borer 101. At the stand 109 there is also attached the workpiece clamping table 2.

The stationary coordinates of the workpiece 1 are portrayed in FIG. 1 by reference characters $x$, $y$ and $z$, whereas the reference characters $x'$, $y'$ and $z'$ represent the coordinate system moved with the headstock 6.

According to the showing of FIG. 2 the drilling spindle 4 is mounted in the spindle sleeve 5 and at its front portion possesses a conical part 7 for taking-up the drill 3 (FIG. 1). Upon the drilling spindle 4 there is arranged a distance or spacer ring 9 which bears against a shoulder 8, and following thereat the inner race or ring 10 of a roller bearing 11, a second spacer ring 12, the three inner races or rings 13, 14 and 15 of an inclined ball bearing 16 and finally a further spacer ring 17. All of these rings or races arranged upon the drilling spindle 4 are pressed against the shoulder 8 with the aid of a double nut member 18, 19 which threaded onto threading of the drilling spindle 4, thus fixed in axial direction. A further roller bearing 20 is arranged at the rear section of the drilling spindle 4 and likewise serves for the mounting of the drilling spindle 4 in the spindle sleeve or tail spindle 5.

The spindle sleeve 5 essentially consists of a tube or tubular member 21 with a flange 22 which internally possesses a bore shoulder or step 23. In the spindle sleeve 5 and bearing against the shoulder or step 23 there is located a ring or annular body 24 having a ring or annular channel 25. This ring channel 25 is connected through the agency of a conduit or line 26 with an electrically controllable three-way valve 301 which connects the conduit 26 in a first position with a pressurized oil source 302 and in a second position with an emptying conduit or line 303. The ring channel 25 forms a ring-shaped compartment for an annular or ring-shaped piston 27 arranged displaceably therein. The annular piston 27 extends by means of a ring-shaped punch 28 past the ring-shaped channel 25. Two seals 29 seal the ring or annular channel 25.

The ring-shaped punch or plunger 28 is arranged to bear against an end surface 30 of a ring-shaped or annular body 31, which ring-shaped body 31 partially extends into a further ring-shaped body 32, wherein the second end surface 33 of the ring-shaped body 31 bears against the outer ring or race 34 of the inclined ball bearing 16. The ring-shaped body 32 is arranged to be axially displaceable in the spindle sleeve 5 and internally possesses a stepped portion or shoulder 35 which serves as a stop for the outer ring or race 34 of the inclined ball bearing 16.

A further ring-shaped or annular body 36 with a number of blindhole bores 37 uniformly distributed over its periphery is arranged in the hollow space between the spindle sleeve 5 and the spacer ring 12 and moves with the spindle sleeve 5. Each blindhole bore 37 contains a helical spring 38 which strives to displace the ring-shaped body 32 in the opposite direction of the feed stroke, in other words in FIG. 2 upwardly.

An outer ring or race 39 of the roller bearing 11 is arranged following at the ring-shaped body 36 containing the springs and is pressed against the ring-shaped body 36 by means of a flange 40 which is attached to the spindle sleeve 5.

The function of the previously described components is as follows:

Prior to the start of the machining process the spindle sleeve 5 together with the drilling spindle 4 and the drill 3 approaches in rapid movement the workpiece 1. In so doing the valve 301 is in its first position, the conduit 26 is under pressure, and also in the ring-shaped compartment of the ring-shaped body 24 there prevails the same pressure, so that the ring-shaped or annular piston 27 is forwardly displaced out of the position shown in FIG. 2. Consequently, the ring-shaped bodies 31 and 32 as well as the inclined ball bearing 16 are simultaneously shifted, and accordingly, also the drilling spindle 4 together with the parts 9, 10, 12, 16, 18 and 19 connected therewith are moved forwardly out of the spindle sleeve 5. The springs 38 are thus compressed together.

Upon contact of the workpiece 1 by the drill 3 there is triggered, in a manner to be described more fully hereinafter, an electrical switching signal, whereby on the one hand the conduit or line 26 is emptied, in that the switching signal shifts the valve 301 into its second position, and, on the other hand, there is brought about a reversal from the rapid movement or advancing stroke into the work stroke.

The lowering of the pressure in the conduit 26 brings about that, under the pressure of the springs 38, the ring-shaped bodies 31 and 32, the piston 27 as well as via the inclined ball bearing 16 the drilling spindle 4 and the components 9, 10, 12, 16, 18 and 19 connected therewith are again moved back into the position illustrated in FIG. 2. Although the spindle sleeve 5 still continually approaches the workpiece 1, the contact between the workpiece 1 and the drill 3 is thus momentarily again interrupted, so that there is rendered impossible destruction of the tool. Until the tool — still moved by the rapid feed stroke in the direction of the workpiece — again contacts the workpiece, there remains sufficient time to switch from the advancing stroke into the working or machining stroke.

The speed-time-graph of FIG. 3 clearly shows such course of movement: the uppermost curve shows the course of the speed of the spindle sleeve 5 in the feed direction with the speed $v$ in the direction ($-z$) according to FIG. 1. In this regard the value $V_1$ constitutes the advance speed or velocity, that is the rapid feed movement and $V_2$ the machining speed. During the time $T_1$ there occurs the acceleration to the rapid speed $V_1$ and the advance movement of the spindle sleeve 5 with the speed or velocity $V_1$. During the time $T_2$ there is switched from the rapid speed over into the machining operation, and during the time $T_3$ the spindle sleeve 5 moves further in the direction $-z$ with the reduced machining speed $V_2$. The intermediate diagram shows the course of the relative speed $V_{rel}$ of the drilling spindle 4 in relation to the spindle sleeve 5. The positive speed peak at the start of the time span $T_1$ is reached upon compression of the springs 38, wherein the drilling spindle according to FIG. 1 has shifted downwardly relative to the spindle sleeve 5 by the amount $h$. During the time $T_2$ there occurs the relaxation of the springs 38, then at the end of the time $T_1$ the drill 3 has contacted the workpiece 1. The drill spindle briefly has imparted to it a negative speed relative to the spindle sleeve, that is, it moves — relative to the spindle sleeve — upwardly by the amount $h$. The lowermost graph shows the course of the drill spindle and the drill $V_{tot}$.

This speed $V_{tot}$ is the sum of the speeds $V$ and $V_{rel}$. It will be recognized that the drill 3, after contacting the workpiece 1, during the time $T_2$ again moves away from the workpiece, although the movement of the spindle sleeve 5 always possesses the direction ($-z$) i.e. the feed direction.

At the end of the time $T_1$ the electrical switch mechanism is triggered since at this moment the workpiece and tool contact one another. Consequently, the return movement of the drilling spindle is brought about and during the time $T_2$ the transmission is switched over to the machining speed without the workpiece and tool contacting one another, that is, without the tool or workpiece becoming damaged, and while preventing the transmission of undesired forces to the drive or transmission.

The remaining parts of the drilling machine are constructed in conventional manner and therefore need not be further described.

According to the showing of FIG. 4 the drilling machine 101 together with the workpiece 1 and the tool 3 constutite part of an electrical resonant circuit. This resonant circuit contains a capacitive impedance 104 and an inductive impedance 103 and is connected via the conductors or lines 110 and 111 with a frequency generator 106. The internal resistance of the high frequency generator 106 is indicated by two ohmic resistors 105. The generator 106 is connected to the locations 107 and 108 at the drilling machine 101. As long as the drill 3 does not contact the workpiece 1 the current flows from the location 107 via the stand 109 of the drilling machine 101 to the location 108. As soon as the drill 3 contacts the workpiece 1 the current can flow from the location 107 via the drill 3 and the workpiece 1 to the location 108. The impedance of the resonant circuit consisting of the machine 101 and the impedance 103 and 104 are thus changed by the contact of the drill 3 and the workpiece 1. The frequency of the generator 106 is selected such that the current under the action of the skin effect flows at the surface of the machine 101, so that during the contact of the drill 3 and the workpiece 1 there occur clear impedance changes. Furthermore, the electrical resonant circuit is adjusted such that the inherent frequency of the machine 101 is in resonance with the generator 106. Upon an impedance change this resonance disappears.

At both of the conductors 110 and 111 which connect the machine 101 with the generator there is connected a bandpass filter 112 which serves the purpose of eliminating external disturbances which could impair the function of the electrical apparatus. At the bandpass filter 112 there is connected a rectifier or rectifier arrangement 113 which transforms a pulsating alternating-current signal into a pulsating direct-current signal. At the rectifier 113 there is connected a filter 114 for smoothing the direct-current signal as well as a double position switch 115, from which there can be delivered the switching signal to the conductor 116 which leads to the switching mechanism of the drilling machine 101, that is to say, on the one hand to the hydraulic valve 301 (see FIG. 2) in order that the drilling spindle can be retracted, and, on the other hand, to the schematically illustrated switching device 300 (FIG. 4) by means of which the feed transmission or drive can be switched from the rapid stroke to the machining stroke.

The function of the described electrical arrangement is as follows:

During the time that the tool 3 approaches the work piece 1 with a rapid advance stroke, that is, during the time that there is still not present any contact between the tool and the workpiece, the electrical resonant circuit oscillates in a state of resonance. The bandpass filter 112 prevents external disturbances from placing into operation the switch mechanism in undesired manner, and the filter 114, which smoothes the pulsating direct-current signal delivered by the rectifier, prevents a continuous switching-in and switching-out of the double position switch 115, so that the conductor 116 does not place into operation the switch or switching mechanism of the machine. As soon as the tool has contacted the workpiece then there occurs a sudden change of the electrical signal in the conductors 110 and 111 which lead to the bandpass filter 112. The bandpass filter 112 is dimensioned such that it does not filter-out this jump or surge. After rectification in the rectifier 113 this change of the electrical signal brings about that the comparator i.e. the double position switch 115 suddenly changes its position. By means of the conductor 116 there is thus delivered to the hydraulic and mechanical switching devices of the machine the switching signal, in particular the valve 301 according to FIG. 2 is switched such that the cylinder compartment 25 is emptied via the conduits 26 and 303.

With resonant circuits which are of similar type in principle the resistances also can be selected such that with open switch the circuit does not oscillate in resonance, that it however oscillates in resonance after the closing of the switch. The mode of operation of the remaining electrical components remains the same as described above. Furthermore, it is possible for a resonant circuit which in its open state is in a state of resonance to connect thereat a generator with automatically variable frequency. In this way there can be achieved the result that the generator frequency can be continuously altered up to the moment when the tool during the rapid advance movement begins to approach the workpiece. During this further adjustment the double position switch does not respond, that is to say, disturbances cannot trigger any false switching signal. At the start of the rapid advancing movement the double position switch is rendered active. Also in this case the mode of operation of the remaining electrical components is the same as just described.

According to the exemplary embodiment illustrated in FIG. 5 the drilling machine 101 is connected to a bridge circuit. At two opposite terminals or junction points 201 and 202 of this bridge circuit there is connected a high-frequency generator 106 and at two further oppositely situated junction points or terminals 203 and 204 of the bridge circuit there is connected a bandpass filter 112. The first branch of the bridge circuit between the junction points or terminals 201 and 204 is formed by drilling machine 101, the second and third branches of the bridge circuit between the junction points 201 and 203 and between the junction points 202 and 204 are formed by two ohmic resistors 205 and 206 and the fourth branch between the junction points 202 and 203 is formed by three parallely connected impedances -- namely an ohmic resistor 207, an inductive impedance or coil 209 and a capacitive impedance or capacitance 208. At the bandpass filter 112 there is again connected a rectifier arrangement or rectifier 113 which converts a pulsating alternating-current signal into a pulsating direct-current signal. At the rectifier 113 there is connected a filter 114 for smoothing the direct-current signal, as well as a two or double position switch 115, from which there is delivered the switching signal to a conductor 116 which leads to the switch mechanism of the drilling machine 101, i.e. on the one hand to the hydraulic valve 301 (see FIG. 2) in order that the drilling spindle can be retracted and, on the other hand to the here not particularly illustrated conventional switching device, by means of which the advance or feed transmission can be switched from the rapid forward movement to the machining operation, as previously explained with respect to FIG. 4.

The drilling machine 101 is connected on the one hand at the location 107 and on the other hand at the location 108 with the junction points 201 and 204 respectively, of the bridge circuit. As long as the drill 3 does not contact the workpiece 1 the current flows from the location 107 via the stand 109 of the drilling machine 101 to the location 108. As soon as the drill 3 contacts the workpiece then the current can flow from the location 107 via the drill 3 and the workpiece 1 to the location 108. The impedance of this branch of the bridge circuit between the junction points 201 and 204 is thus changed by the contact of the drill 3 and workpiece 1. The frequency of the generator 106 is selected such that the current, under the action of the skin effect, flows at the surface of the drilling machine 101, whereby during the contact of the drill 3 and the workpiece 1 clear impedence changes occur.

The function of the electrical part of the inventive apparatus according to FIG. 5 is as follows:

The alternating-current resistors 207, 208 and 209 are selected such that the bridge is balanced when there is no contact between the drill 3 and the workpiece 1. The contact between the drill 3 and the workpiece 1 brings about a tuning of the bridge and thus a change of the electrical signal in the conductors which connect the junction points 203 and 204 with the bandpass filter 112. In the same manner as for the apparatus according to FIG. 4 there is thus generated in the conductor or line 116 the switching signal.

The alternating-current resistors 207, 208 and 209 can possess adjustment or variation possibilities. In this way the bridge can be continuously automatically post-tuned until the moment in which the tool in a rapid forward movement begins to approach the workpiece. This arrangement of adjustable or variable alternating-current resistors or impedances has the advantage that the voltage fluctuations and external disturbances cannot generate any false switching signal.

The use of the described equipment is not limited to single stand drilling machines. The equipment can be correspondingly accommodated also at crane or gantry drilling machines as well as at other machine tools.

While there is shown and described present preferred embodiments of the invention, it is to be distinctly understood that the invention is not limited thereto, but may be otherwise variously embodied and practised within the scope of the following claims.

Accordingly, what is claimed is:

1. An apparatus for a machine tool for the automatic generation of a switching signal and for reducing the speed of a tool from the advance feed stroke into the work stroke upon approach of the tool at a workpiece, the improvement comprising: mechanism for accelerating the tool in a direction opposite said feed stroke, means for producing a switching signal for electrically actuating said mechanism when the tool approaches said workpiece, said producing means including an electrical current circuit, the machine tool constituting part of said electrical current circuit, the impedance change of said circuit, upon contact of the workpiece by the tool, triggering said switching signal.

2. The apparatus as defined in claim 1, wherein the machine tool forms part of an electrical current circuit defining a resonant circuit, an alternating-current generator connected with said resonant circuit, said resonant circuit incorporating an inductive impedance and a capacitive impedance and wherein the impedence of the resonant circuit changes upon the contact of the tool and the workpiece.

3. The apparatus as defined in claim 2, further including a double position switch means for converting the aforesaid impedence changes into the switching signal.

4. The apparatus as defined in claim 3, further including a bandpass filter, rectifier means and a capacitance arranged in circuit between the resonant circuit and the double position switch means.

5. The apparatus as defined in claim 3, wherein predetermined components of the resonant circuit upon contact of the tool and workpiece are connected with one another by an electrical bridge circuit.

6. The apparatus as defined in claim 5, wherein the machine tool upon contact of the workpiece and the tool forms a branch of the electrical bridge circuit, three impedances forming a branch of the bridge circuit which is opposite the machine, and the alternating-current generator is connected to two opposite junction points of the bridge circuit and the double position switch meeans is connected to the remaining two junction points of the bridge circuit.

7. An apparatus for a machine tool for the automatic generation of a switching signal and for reducing the speed of a tool from the advance feed stroke into the work stroke upon approach of the tool at a workpiece, the improvement comprising mechanism for accelerating the tool in a direction opposite said feed stroke, and means for producing a switching signal for electrically actuating said mechanism when the tool approaches said workpiece, a work spindle carrying the tool, said work spindle being axially displaceably arranged in an axially displaceable spindle sleeve, energy storge means which are supported at the work spindle carrying the tool and at the spindle sleeve for displacing the work sppindle opposite to the feed direction, the energy storage means comprising at least one spring which bears at the work spindle carying the tool and at the spindle sleeve, wherein a number of said springs are arranged at the periphery of the work spindle as energy storage means.

8. An apparatus for a machine tool for the automatic generation of a switching signal and for reducing the speed of a tool from the advance feed stroke into the work stroke upon approach of the tool at a workpiece, the improvement comprising mechanism for accelerating the tool in a direction opposite said feed stroke, means for producing a switching signal for electrically actuating said mechanism when the tool approaches said workpiece, a work spindle carrying the tool, said work spindle being axially displaceably arranged in an axially displaceable spindle sleeve, energy storage means which are supported at the work spindle carrying the tool and at the spindle sleeve for displacing the work spindle opposite to the feed direction, at least one cylinder equipped with a hydraulically displaceable piston arranged between the work spindle and the spindle sleeve for displacing the work spindle in the feed direction.

9. The apparatus as defined in claim 8, wherein each cylinder is connectable, via a valve incorporating said mechanism which can be electrically actuated by said switching signal, at a discharge conduit for emptying said cylinder.

10. An apparatus for a machine tool equipped with a tool and operating with an advance feed stroke and a work stroke, comprising an axially displaceable spindle sleeve, a work spindle for carrying the tool axially displaceably arranged in said axially displaceable spindle sleeve, mechansim for accelerating the tool in a direction opposite said advance feed stroke, said mechanism including energy storage means comprising at least one spring which bears at the work spindle carrying the tool and at the spindle sleeve for displacing the work spindle opposite to the feed direction, and at least one cylinder equipped with a hydraulically displaceable piston arranged between the work spindle and the spindle sleeve for displacing the work spindle in the feed direction.

11. An apparatus for a machine tool for the automatic generation of a switching signal and for reducing the speed of a tool from the advance feed stroke into the work feed stroke upon approach of the tool at the workpiece, the improvement comprising: an electrical current circuit, means for connecting said electrical current circuit in circuit with said machine tool such that upon contact of the workpiece by the tool the impedance of said electrical current circuit changes in order to trigger the switching signal.

* * * * *